US011873664B2

(12) United States Patent
Emma, Jr. et al.

(10) Patent No.: US 11,873,664 B2
(45) Date of Patent: Jan. 16, 2024

(54) EMERGENCY DEADBOLT DEVICE WITH SINGLE ACTION UNLOCK

(71) Applicant: DEFCON PRODUCTS, LLC, Sterling, MA (US)

(72) Inventors: Salvatore Emma, Jr., Sterling, MA (US); Chad Zrate, Fitchburg, MA (US)

(73) Assignee: DEFCON PRODUCTS, LLC, Sterling, MA (US)

(*) Notice: Subject to any disclaimer, the term of this patent is extended or adjusted under 35 U.S.C. 154(b) by 579 days.

(21) Appl. No.: 17/032,415

(22) Filed: Sep. 25, 2020

(65) Prior Publication Data

US 2021/0079694 A1 Mar. 18, 2021

Related U.S. Application Data

(63) Continuation-in-part of application No. 16/139,827, filed on Sep. 24, 2018, now Pat. No. 11,214,986.

(60) Provisional application No. 62/905,568, filed on Sep. 25, 2019.

(51) Int. Cl.

| | |
|---|---|
| ***E05B 35/00*** | (2006.01) |
| ***E05B 65/10*** | (2006.01) |
| ***E05C 1/00*** | (2006.01) |
| ***E05C 1/02*** | (2006.01) |
| ***E05B 63/00*** | (2006.01) |

(52) U.S. Cl.

CPC .......... *E05B 65/1086* (2013.01); *E05B 35/00* (2013.01); *E05B 63/0017* (2013.01); *E05C 1/004* (2013.01); *E05C 1/02* (2013.01); *E05Y 2201/474* (2013.01); *E05Y 2201/626* (2013.01); *E05Y 2201/638* (2013.01); *E05Y 2900/132* (2013.01)

(58) Field of Classification Search

CPC .... E05B 65/1086; E05B 89/02; E05B 55/005; E05B 59/00; E05B 35/00; E05B 63/0017; E05C 1/004; E05C 1/02; E05Y 2201/474; E05Y 2201/626; E05Y 2201/638; E05Y 2201/132; Y10T 70/5226

USPC .......................................................... 70/107

See application file for complete search history.

(56) References Cited

U.S. PATENT DOCUMENTS 3,791,180 A * 2/1974 Doyle .................... E05B 59/00 292/34
5,004,287 A * 4/1991 Doyle ................ B62D 33/0273 292/DIG. 43
5,829,801 A * 11/1998 Tindall ...................... E05B 7/00 292/336.3

(Continued)

*Primary Examiner* — Suzanne L Barrett
(74) *Attorney, Agent, or Firm* — Juan Carlos Marquez; Marquez IP Law Office, PLLC

(57) ABSTRACT

The unlocking mechanism of the present invention is actuated as a result of contact with the door's existing lever. When an occupant rotates the door's lever, it not only retracts the door's latch, but the handle will also engage the unlocking mechanism of the present invention, the door lever engaging the unlocking mechanism. The door's lever follows the geometry of the cam thereby pushing the sliding bar of the unlocking mechanism thereby engaging a latch release. The latch release moves the locked lever of the door's deadbolt assembly and the deadbolt is retracted. When the door's lever is returned to its normal state, a spring pushes the sliding bar backward to the ready position. The latch release rotates to its ready position and the mechanism is ready for a subsequent activation.

4 Claims, 13 Drawing Sheets

(56) References Cited

U.S. PATENT DOCUMENTS

| | | | | |
|---|---|---|---|---|
| 6,595,561 | B1 * | 7/2003 | Szablewski | E05B 83/16<br>292/341.15 |
| 7,775,072 | B2 * | 8/2010 | Pullmann | F16P 3/10<br>292/DIG. 31 |
| 8,814,233 | B2 * | 8/2014 | Leska | F16P 3/10<br>292/144 |
| 9,159,210 | B2 * | 10/2015 | Jones, Jr. | G08B 27/001 |
| 9,354,619 | B2 * | 5/2016 | Ergenbright | G08B 25/10 |
| 11,214,986 | B2 * | 1/2022 | Emma | E05C 1/04 |
| 2004/0159134 | A1 * | 8/2004 | Eichenauer | E05B 47/0046<br>70/278.1 |
| 2014/0319850 | A1 * | 10/2014 | Berger | E05C 19/163<br>292/177 |
| 2016/0230431 | A1 * | 8/2016 | Yonekura | E05C 19/188 |
| 2021/0079694 | A1 * | 3/2021 | Emma, Jr. | E05B 35/008 |

* cited by examiner

EMERGENCY DEADBOLT DEVICE WITH SINGLE ACTION UNLOCK

This application claims priority to the U.S. Provisional Application No. 62/905,568 filed on Sep. 25, 2019, and claims priority as a continuation-in-part to U.S. application Ser. No. 16/139,827 filed on Sep. 24, 2018, the entire contents and disclosure of which are hereby incorporated by reference.

BACKGROUND OF THE INVENTION

The present invention is in the technical field of door bolting and barricading devices. More particularly, the present invention is in the technical field of door deadbolt devices that allow rapid engagement and disengagement of the bolting mechanism from both the inside and the outside of a door using a special tool to prevent unauthorized persons from deploying the locking mechanism from the inside, while providing safety personnel the ability to unlock the door from the outside in an emergency. Inmost jurisdictions at least around the U.S., building and fire codes dictate that a single linear or rotational operation is allowed to unlock and unlatch a door which is in the path of egress.

It is desirable to have all of the locks and latches on a door retract in a single mechanically connected operation. This allows an occupant to quickly exit the room without prior knowledge of the location or operation of door locks thereby hindering egress.

SUMMARY OF THE INVENTION

The present invention comprises an unlocking mechanism designed to interoperate with the deadbolt device that is the subject of U.S. application Ser. No. 16/139,827 filed on Sep. 24, 2018, the entire contents of which are incorporated herein by reference. The unlocking mechanism of the present invention is actuated as a result of contact with the door's existing lever. When an occupant rotates the door's lever, it not only retracts the door's latch, but the handle will also engage the unlocking mechanism of the present invention, the door lever engaging the unlocking mechanism. The door's lever follows the geometry of the cam thereby pushing the sliding bar of the unlocking mechanism thereby engaging a latch release. The latch release moves the locked lever of the door's deadbolt assembly and the deadbolt is retracted. When the door's lever is returned to its normal state, a spring pushes the sliding bar backward to the ready position. The latch release rotates to its ready position and the mechanism is ready for a subsequent activation.

In at least a first embodiment, when an occupant rotates the door's lever, it not only retracts the door's latch, but the handle will also engage the unlocking mechanism of the present invention, the door lever making contact on a cam feature on the unlocking mechanism, during its arc of rotation. The door's lever follows the geometry of the cam thereby pushing the sliding bar of the unlocking mechanism thereby engaging and rotating a latch release. The latch release rotates and moves the locked lever of the door's deadbolt assembly and the deadbolt is retracted. When the door's lever is returned to its normal state, a spring pushes the sliding bar backward to the ready position. The latch release rotates to its ready position and the mechanism is ready for a subsequent activation.

The present invention is directed to satisfying the applicable building code and ADA requirements by using the natural rotation of the door's lever. This is considered to be a "mechanically interconnected" means of unlocking the door without modifying the door's hardware or violating the door's fire rating.

DESCRIPTION OF DRAWINGS

The present invention is illustrated in the accompanying drawings, wherein.

DETAILED DESCRIPTION OF THE PREFERRED EMBODIMENTS

Figure 1:
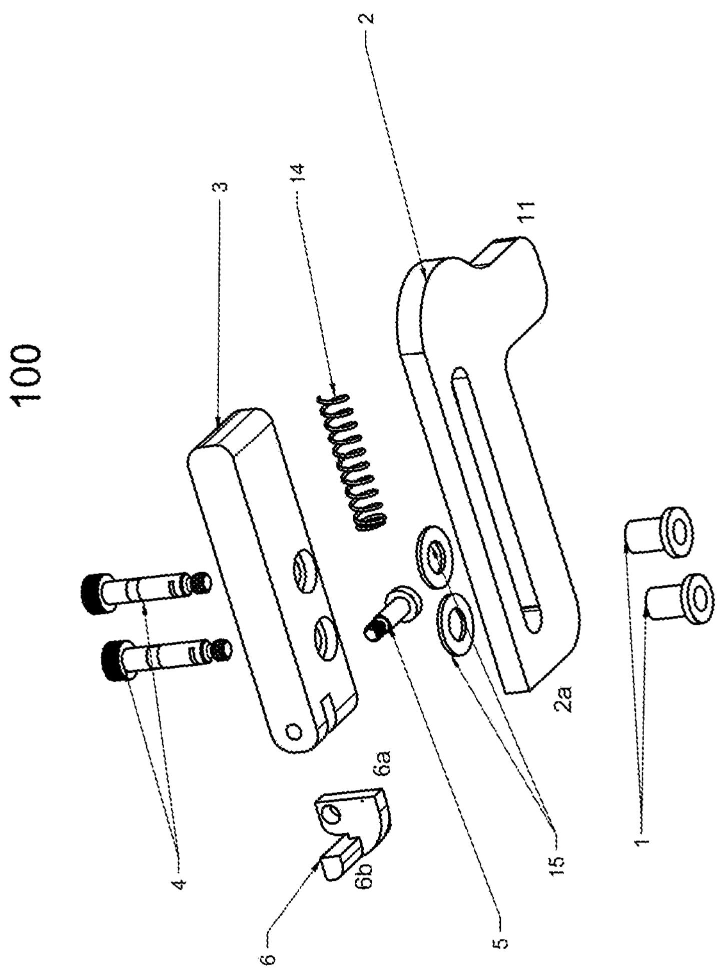
FIG. 1 illustrates an exploded assembly of a first embodiment of an unlocking mechanism of the present invention.

In FIG. 1, the unlocking mechanism 100 according to a first embodiment of the present invention is comprised of a set of shoulder washers 1 which will provide a lubricious or reduced friction contact with the sliding bar 2. The shoulder washers 1 and flat washers 15 are assembled between the sliding bar 2 and the cover 3. The shoulder washers 1 also prevent over-torqueing the shoulder screws 4 allowing free movement of the slide bar 2. The slide bar 2 is moved to the unlocking position under resistance of a spring 14 which also returns the slide bar 2 into a ready position.

Figure 2:
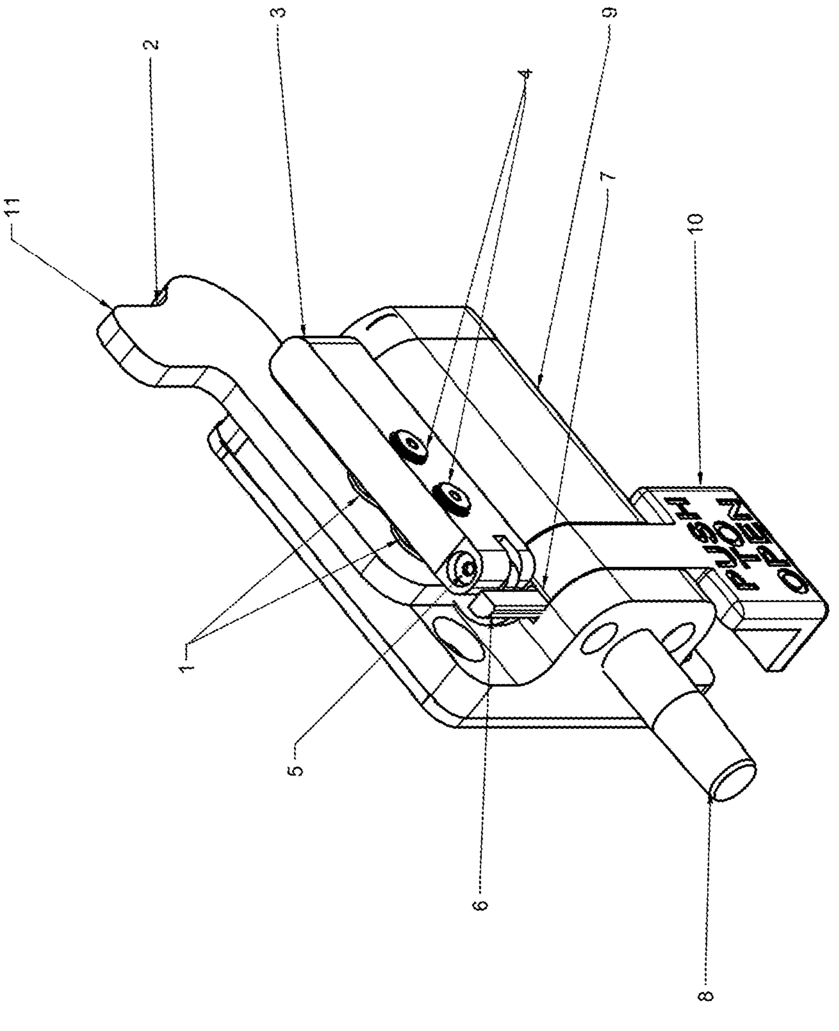
FIG. 2 illustrates a deadbolt assembly and an attached unlocking mechanism in the locked state according to the first embodiment of the present invention.

FIG. 2 illustrates the unlocking mechanism 100 attached to a deadbolt device 9. The deadbolt 8 is illustrated in the locked position and typically an occupant would press the egress lever 10 in order to release the deadbolt 8. At this stage of the operation of the unlocking mechanism 100 to retract the deadbolt 8, the latch release 6 is in the ready state with a cam face 6*a* of the latch release 6 in contact with the front face 2*a* of the slide bar 2. When the sliding bar 2 moves leftward in this illustration, it engages the cam face 6*a* of the latch release 6 which rotates on an axle based on the shoulder screw 5. At this stage of the operation, the unlocking mechanism 100 is transitioning from the locked state to the unlocked state.

Figure 3:
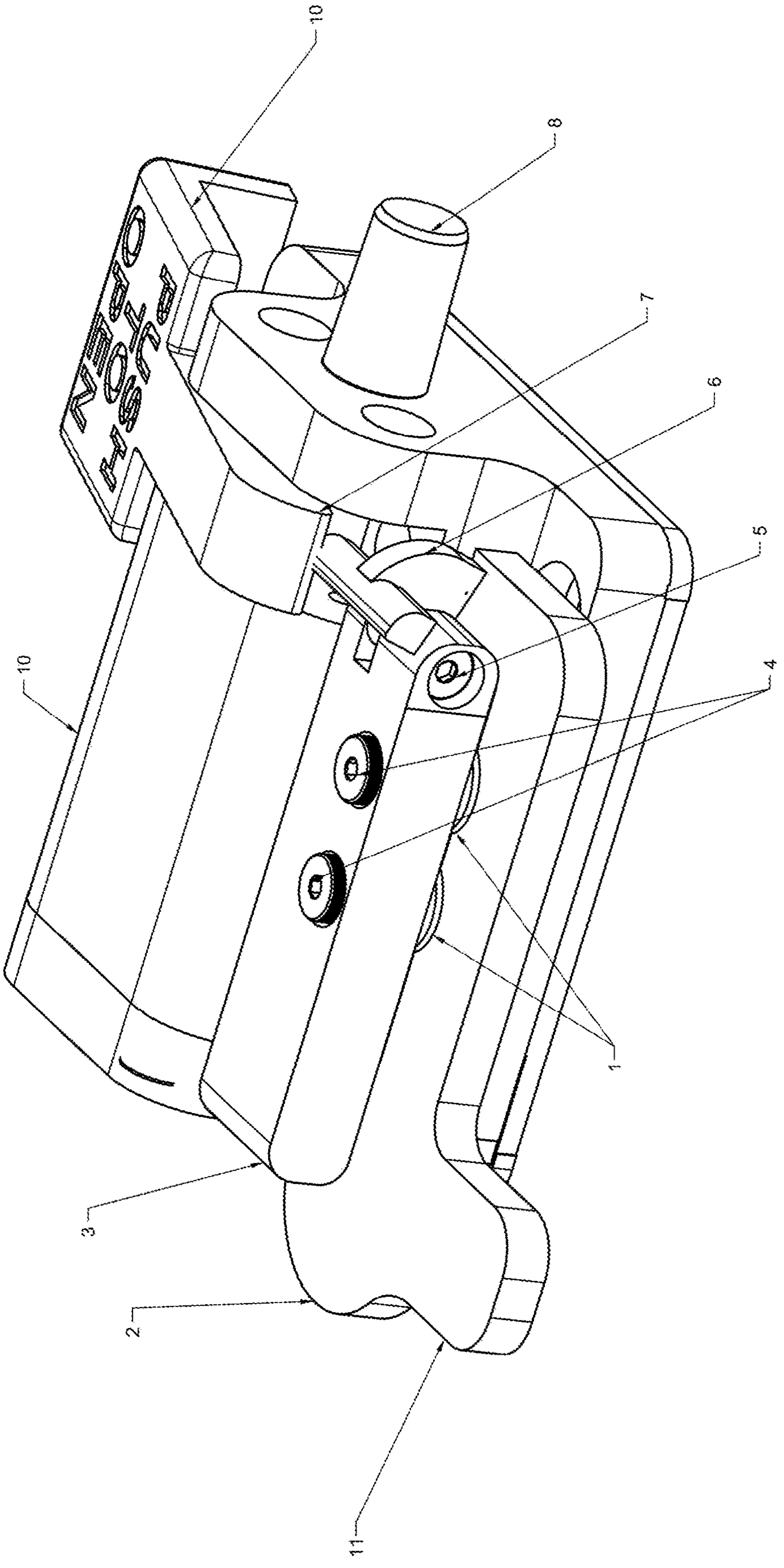
FIG. 3 illustrates a deadbolt assembly and an attached unlocking mechanism during the unlocking action according to the first embodiment of the present invention.

As shown in FIG. 3, the unlocking mechanism 100 attached to a deadbolt device 9 is in the unlocked state. The sliding bar 2 has been moved and the latch release 6 has rotated. The curved surface of the cam rod 6*b* contacts the latch end 7 as the latch release 6 rotates, thereby pushing the latch end 7 of the deadbolt device 9, releasing the deadbolt 8 and allowing the deadbolt 8 to move into the unlocked position.

Figure 4A:
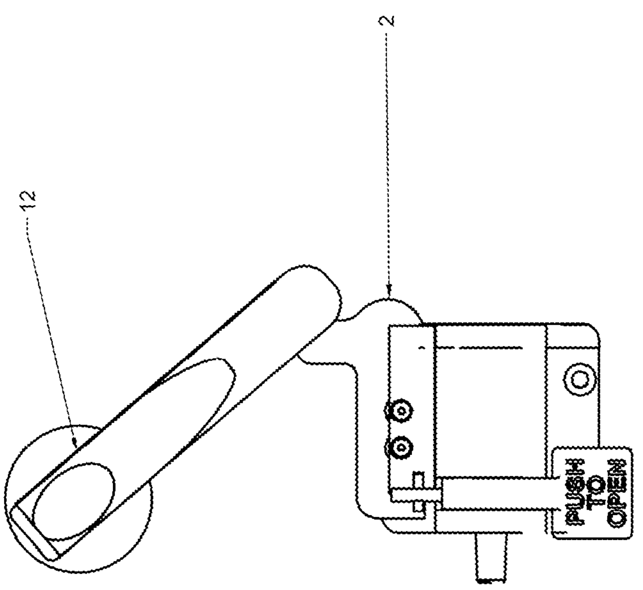
FIGS. 4A and 4B illustrate a deadbolt assembly and an attached unlocking mechanism in its proximity to a typical door lever according to the first embodiment of the present invention.
Figure 4B:
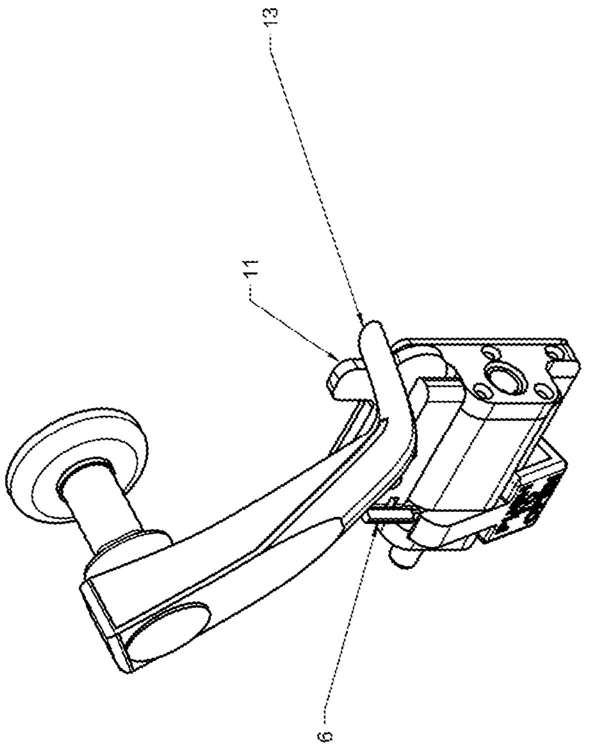

FIGS. 4A and 4B illustrate a typical door lever 12 as it rotates (in this case, a clockwise rotation) thereby engaging and moving the sliding lever 2. As shown, a distal end of the door lever 12 rotatively moves into contact with the engaging cam head 11 of the sliding bar 2. The continuing rotation of the door lever 12 pushes its distal end further against the cam head 11, thereby sliding the sliding bar 2 leftward toward and against the latch release 6.

Figure 5:
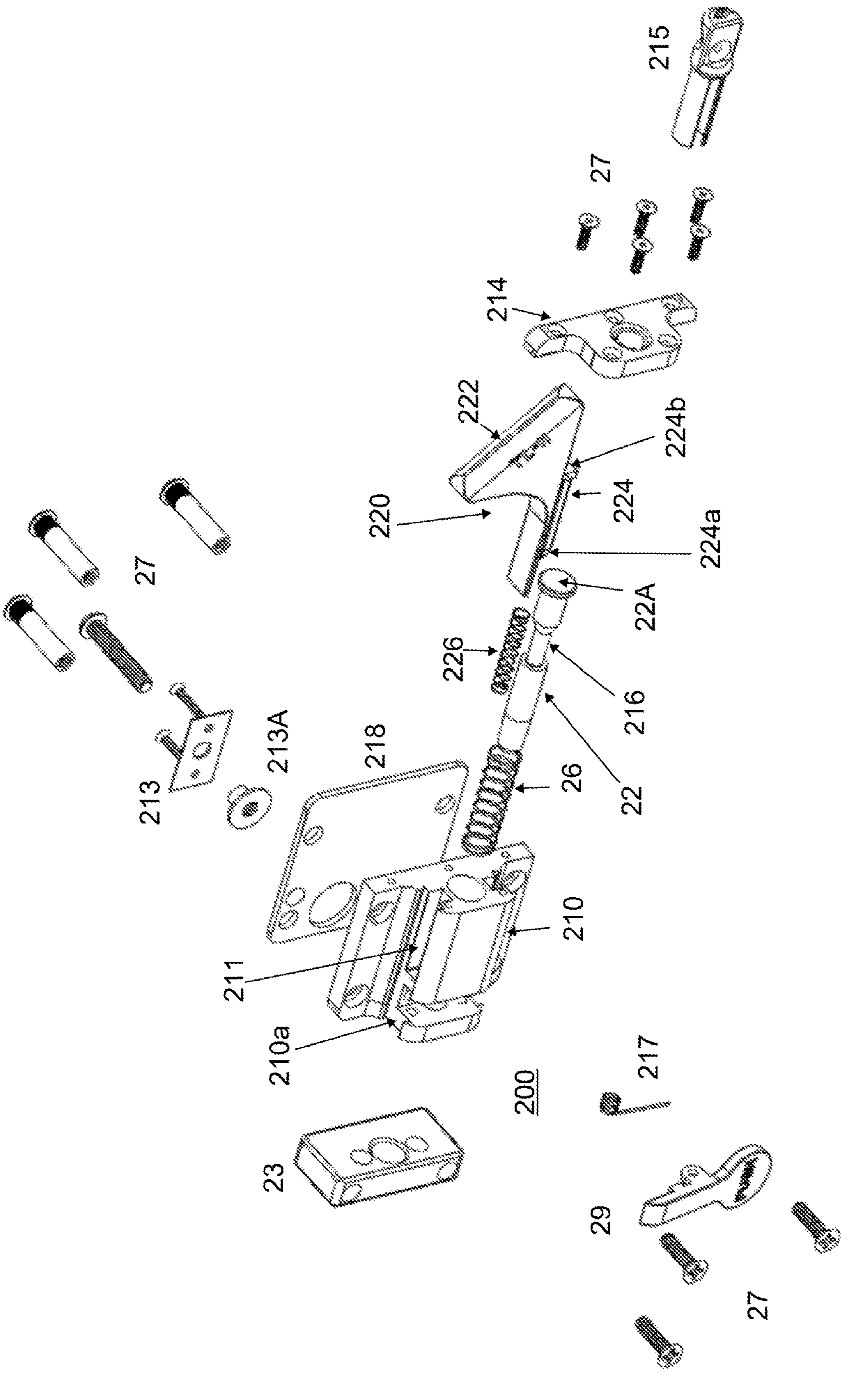
FIG. 5 illustrates an exploded assembly of a deadbolt assembly and an attached unlocking mechanism according to the second embodiment of the present invention.
Figure 6:
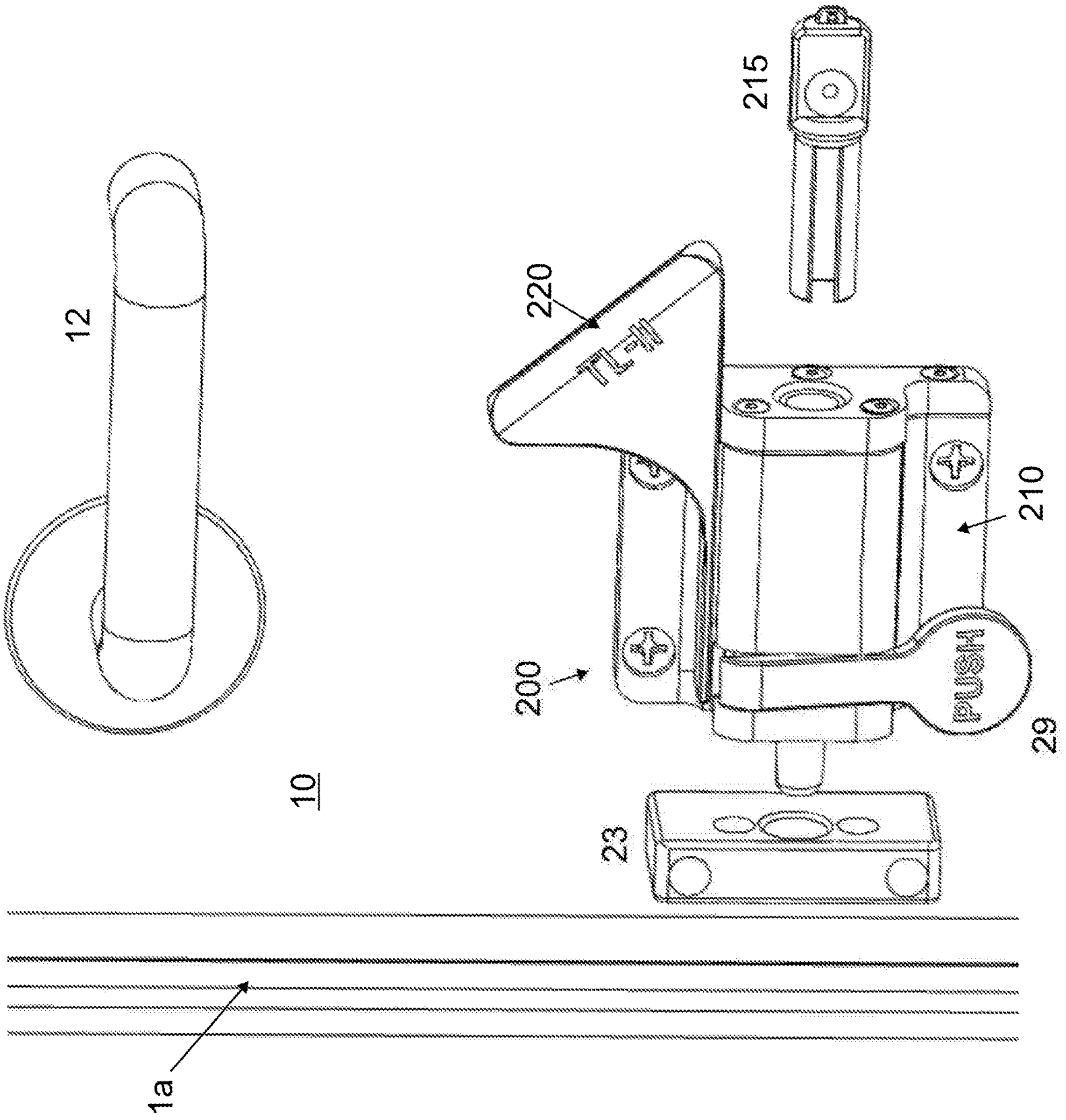
FIG. 6 illustrates an overall perspective view of a deadbolt assembly, an attached unlocking mechanism and a key in the unlocked state according to a second embodiment of the present invention.

FIG. 5 illustrates an exploded assembly of a deadbolt assembly and an attached unlocking mechanism according to a second embodiment of the present invention. As shown in FIG. 5, there is generally shown a deadbolt device 200 having an assembly housing 210 mountable to a door 21 (see FIG. 6) with a mounting shim plate 218 and having a removable key or tool 215 which is fitted through a tamper resistant plate 214; a deadbolt 22; a deadbolt spring 26; a universal deadbolt strike 23; a door unbolting lever 29; mounting hardware comprising metal screws 27, affixing through housing 210 and deadbolt keeper drill holes 211; an outside unlocking key tool 212 (not shown); an optional outside keyhole plate 213 and an outside keyhole insert nut 213*a*. The door unbolting lever 29 comprises a locking mechanism 28 capable of locking the deadbolt 22 in place under pressure from the deadbolt spring 26 which also secures the deadbolt 22 into its engaged position. The universal deadbolt strike 23 is mounted to the door frame 1*a* (see FIG. 6) and positioned to receive the deadbolt 22 when the deadbolt 22 is in the engaged and locked position.

The assembly housing 210 is formed with a sliding channel 210*a* into which the unlocking mechanism 220 is slidably positioned. The sliding channel 210*a* further has a guide groove 211 into which a guide tab 224*b* of the latch release bar 224 and a spring 226 are slidably positioned so as to guide the movement of the latch release bar 224 within the sliding channel 210*a* while urging the latch release bar rightward away from the unbolting lever 29.

The unlocking mechanism 220 is composed of a sliding contact shoulder 222 fixedly attached above a latch release bar 224 that is slidably positioned in the sliding channel 210*a*. The latch release bar 224 is formed with a cam portion 224*a* that engages with an upper portion of the unbolting lever 29 when the latch releaser bar 224 is moved leftward along the sliding channel 210*a*. In the ready state, the unbolting lever 29 is positioned adjacent to but not in contact with the latch release bar 224. The latch release bar 224 is movable leftward to the unlocking position against resistance of the spring 226 which is positioned to return the latch release bar 224 rightward into a ready position. In this second embodiment, the sliding contact shoulder 222 is formed with an angled portion (i.e., approximately 45 degrees) that is designed to slidably contact with the door lever 12. As would be understood by those of skill in the art, the angled portion of the sliding contact shoulder 222 may be formed with any other angular position or shape (i.e., a circular, semi-circular, curved) that would accommodate sliding contact with the door lever 12 to then operate the latch release bar 224 in accordance with the present invention disclosed herein.

A locking neck portion 216 of the deadbolt 22 is formed to engage the locking mechanism 28 or other similar mechanism to keep the deadbolt 22 in the locked position under tension of the deadbolt spring 26. In at least one embodiment, the locking neck portion 216 is composed of a portion of the length of the deadbolt 22 that has a narrower diameter than the remainder of the length of the deadbolt 22. The locking neck portion 216 may be formed by machining. The locking mechanism 28 is formed on the door unbolting lever 29 to extend into the bore 219 through the lever slot 210*b*. The unbolting lever 29 is hinged in the lever slot 210*b* and mounted via a mounting bolt (not shown) with the unbolting lever spring 217 in a compressed state, wherein the lever spring 217 rotatively urges the unbolting lever 29 and thus the locking mechanism 28 into the bore 219. As the deadbolt 22 slides into the bore 219, the locking neck portion 216 will pass by the lever slot 210*b* and engage with the locking mechanism 28. Pushing down on the button portion 29*a* rotatively disengages the locking mechanism 28 from the locking neck portion 216, which then releases the deadbolt 22 and the compression of the deadbolt spring 26. The deadbolt 22 is released but retained within the deadbolt housing 210.

To lock the bolt, the removable key or tool 215 is inserted through the keyhole slot 214*a* in the tamper resistant plate 214 pushing against the activator 22*a* of the deadbolt 22 to slide the deadbolt 22 through the bore 219 in the assembly housing 210 under tension of the deadbolt spring 26, until it is locked into position when the locking neck portion 216 of the bolt 22 engages with the locking mechanism feature 28 of the door unbolting lever 29.

To unlock the bolt via the operation of the door lever 12, the door lever 12 is rotated as normal as to contact the sliding contact shoulder 222. Further rotation of the door lever 12 then slidably pushes the unlocking mechanism 220 via the latch release bar 224 along the sliding channel 210*a*, which correspondingly pushes the cam portion 224*a* engaging with the upper portion of the unbolting lever 29. The hinged unbolting lever 29 rotatively moves thus disengaging the locking mechanism 28 from the locking neck portion 216 of the deadbolt 22.

Figure 7:
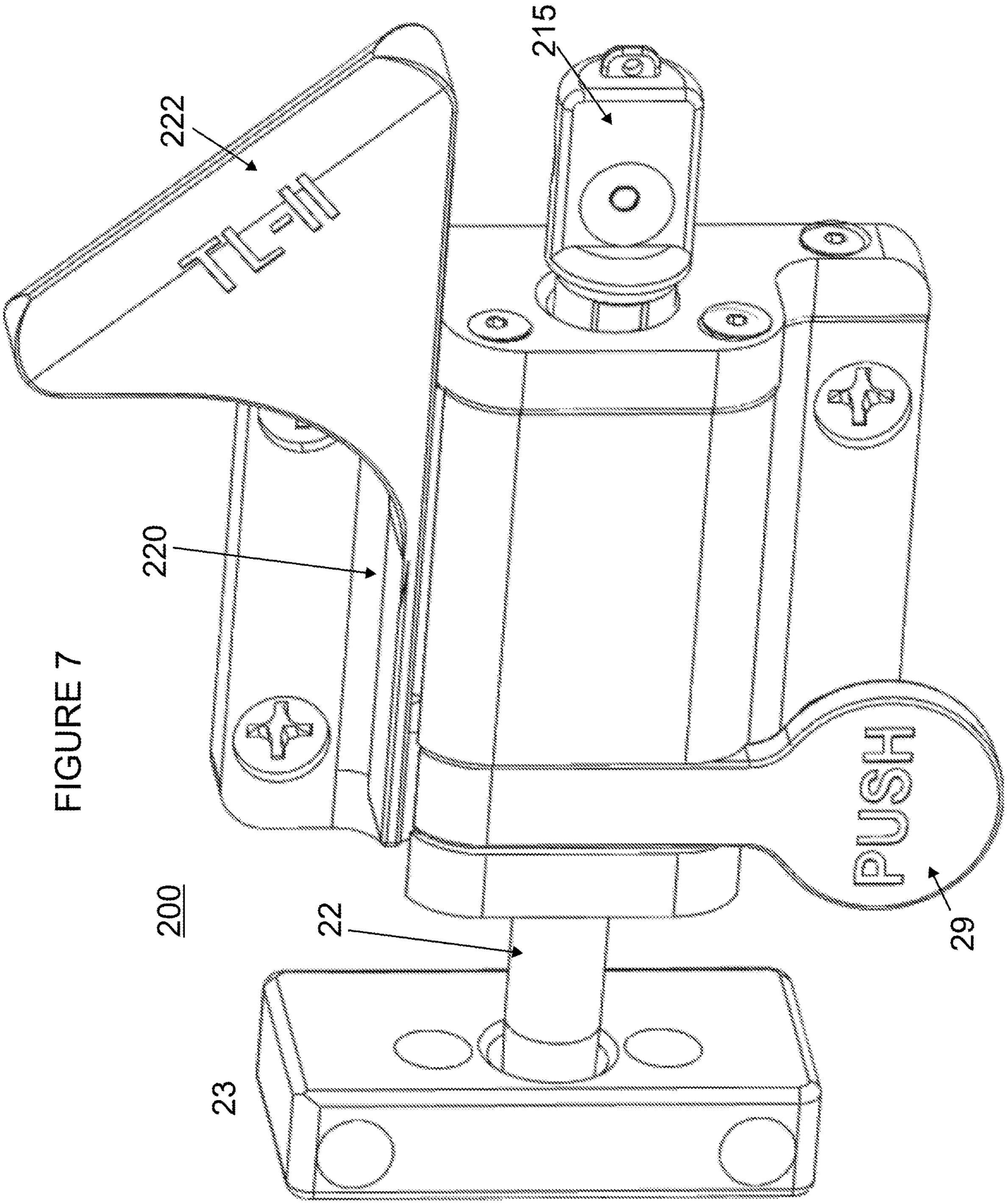
FIG. 7 illustrates a deadbolt assembly, an attached unlocking mechanism and a key in the locked state according to the second embodiment of the present invention.

FIG. 7 illustrates the unlocking mechanism 220 attached to the deadbolt device 200. The deadbolt 22 is illustrated in the locked position with the activator key 215 still in place to engage the deadbolt with the universal strike 23. In this state, the deadbolt 22 is fully engaged and the door (not shown) to which the deadbolt device 200 is mounted is secured. An occupant need only remove the activator key 215 form the deadbolt device 200.

Figure 8A:
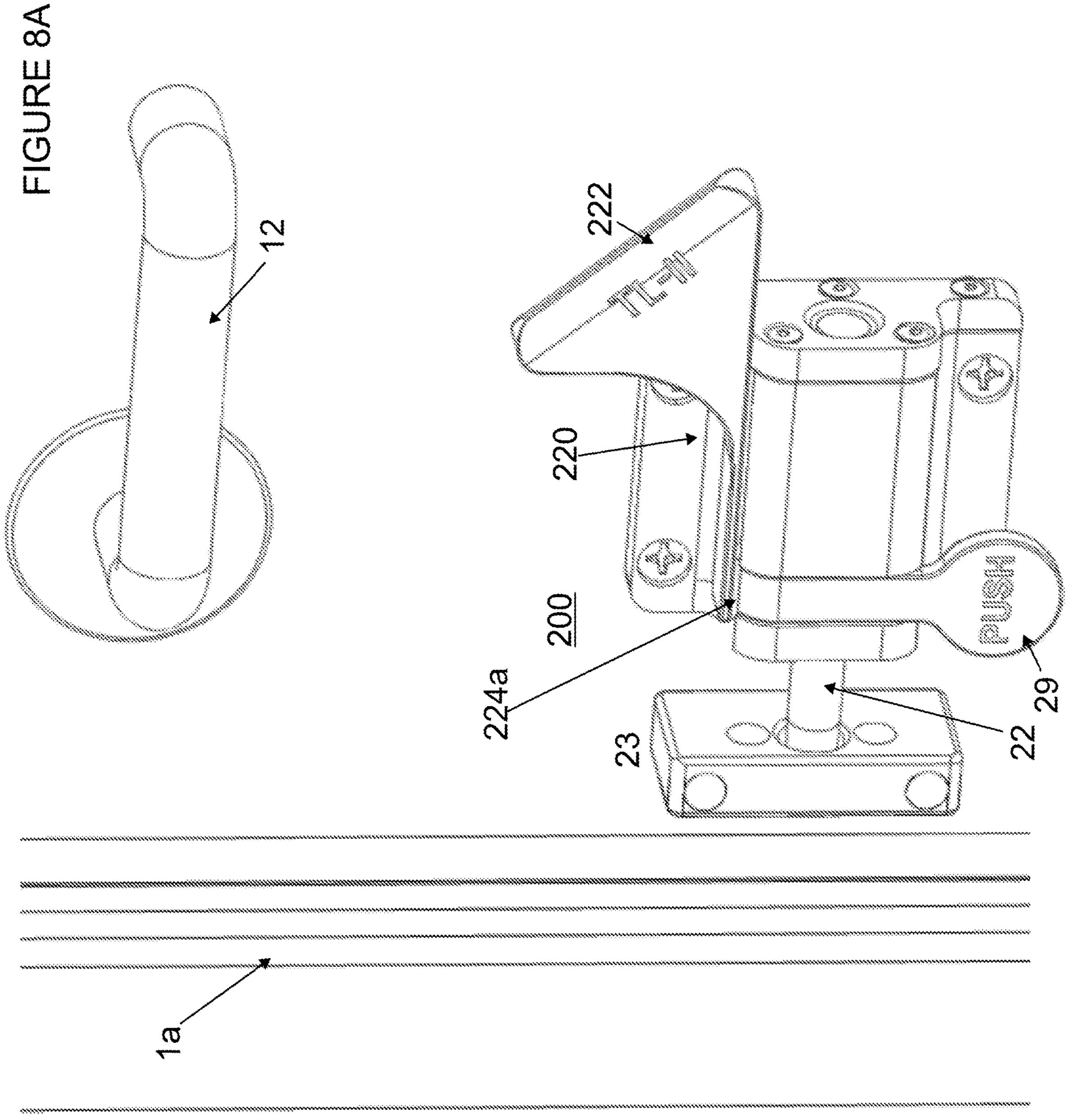
FIG. 8A illustrates an overall perspective view of a deadbolt assembly and an attached unlocking mechanism in the locked state relative to the door lever according to a second embodiment of the present invention.

According to FIG. 8A, in order to engage the unlocking mechanism 220 according to the second embodiment, an occupant would press the door lever 12 in order to release the deadbolt 22. At this stage of the operation of the unlocking mechanism 220 to retract the deadbolt 22, the door lever 12 has not yet been pressed and the latch release bar 224 of the unlocking mechanism 220 is in the ready state with the cam face 224a adjacent to or only in light contact with the upper portion of the unbolting lever 29.

Figure 8B:
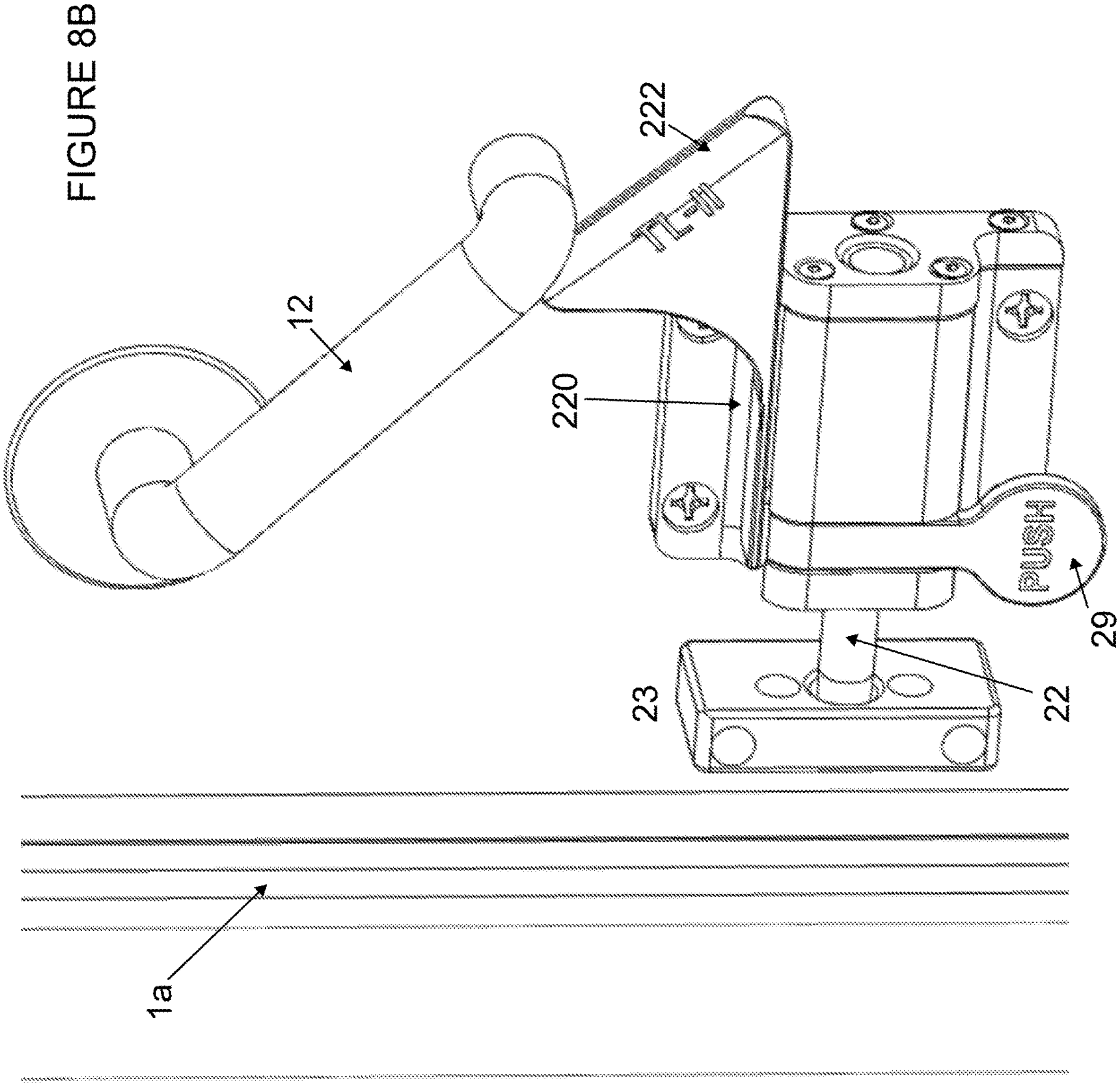
FIG. 8B illustrates an overall perspective view of a deadbolt assembly and an attached unlocking mechanism in the locked state with the door lever contacting the unlocking mechanism according to a second embodiment of the present invention.

As shown in FIG. 8B, the door lever 12 is rotated as normal as to contact the sliding contact shoulder 222. At this stage of the operation, the unlocking mechanism 220 is transitioning from the locked state to the unlocked state.

Figure 8C:
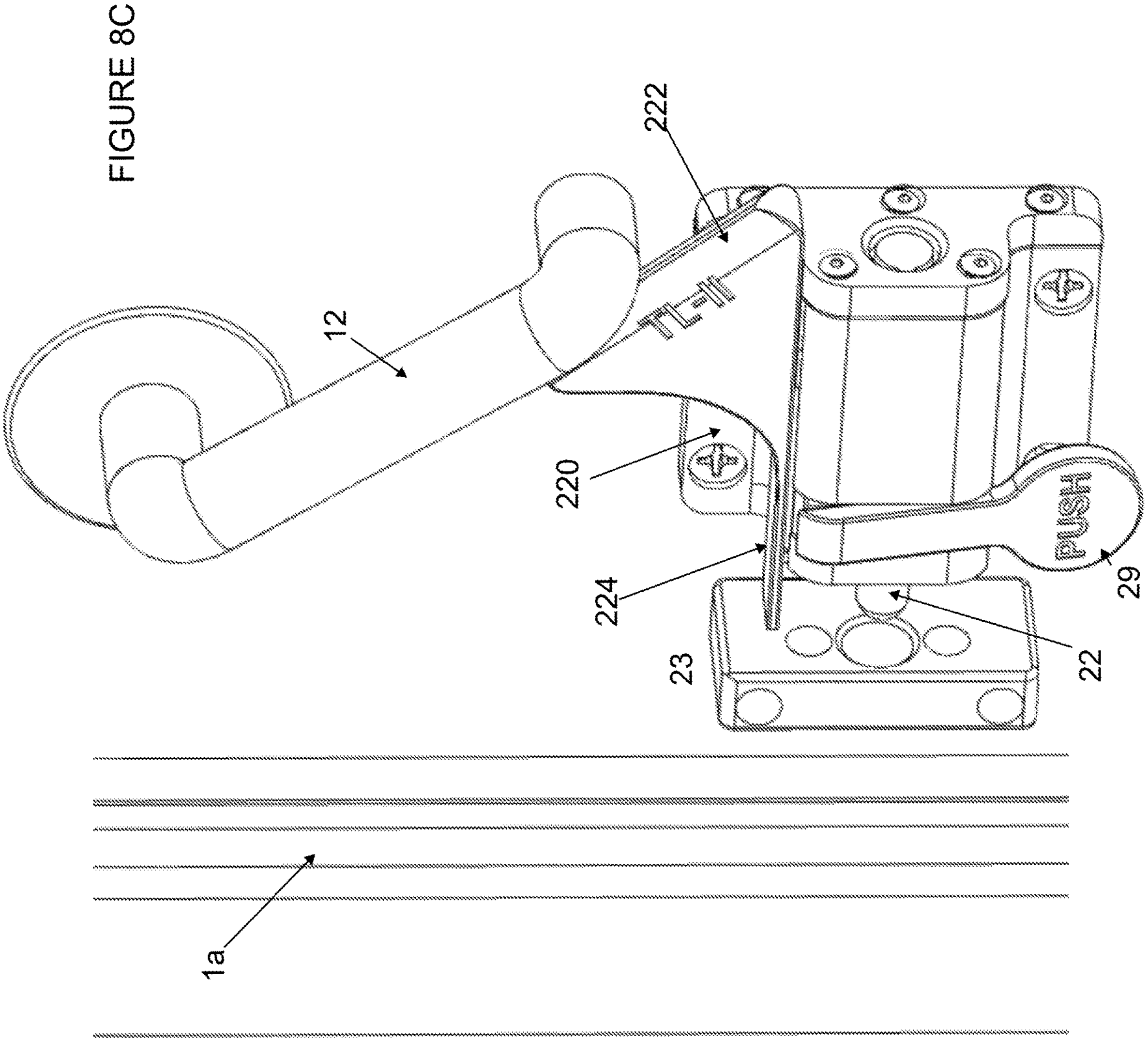
FIG. 8C illustrates an overall perspective view of a deadbolt assembly and an attached unlocking mechanism in the locked state with the door lever contacting the unlocking mechanism and the latch release in the unlocking state according to a second embodiment of the present invention.

FIG. 8C shows that the further rotation of the door lever 12 slidably pushes the unlocking mechanism 220 via the latch release bar 224 along the sliding channel 210a, which correspondingly pushes the cam portion 224a thereby engaging with the upper portion of the unbolting lever 29. The hinged unbolting lever 29 rotatively moves thus disengaging the locking mechanism 28 from the locking neck portion 216 of the deadbolt 22. The deadbolt 22 thus retracts back into the deadbolt housing 210 as a result of the urging force of the deadbolt spring 26.

Figure 8D:
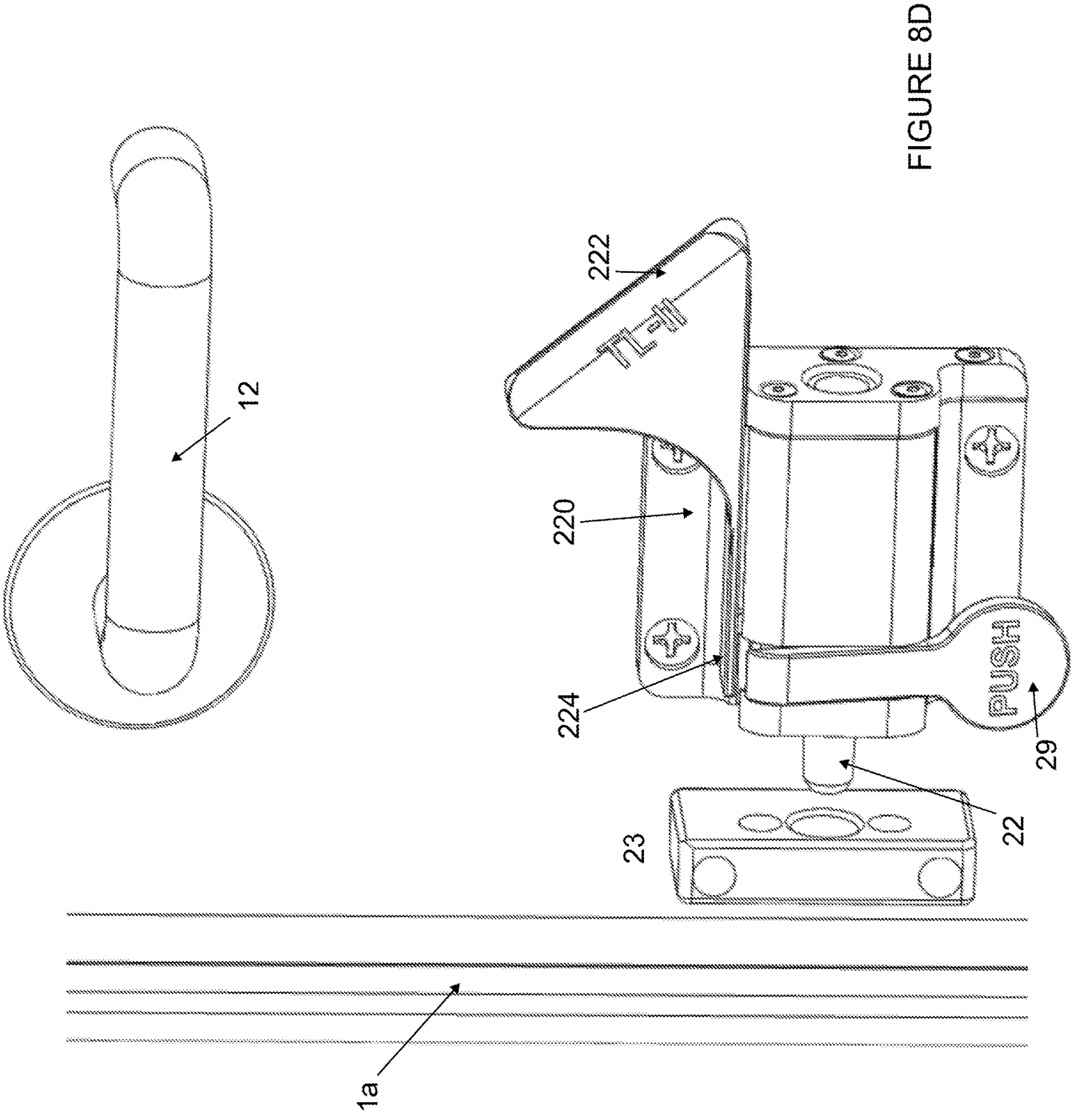
FIG. 8D illustrates a deadbolt assembly and an attached unlocking mechanism key in unlocked state the locked state according to the second embodiment of the present invention.

As shown in FIG. 8D, the door lever 12 is released and rotated back away from the sliding contact shoulder 222. At this stage of the operation, the door 1a is in an unsecured state, the deadbolt device 200 is back in the unlocked state and the unlocking mechanism 220 is in the ready state.

Figure 9:
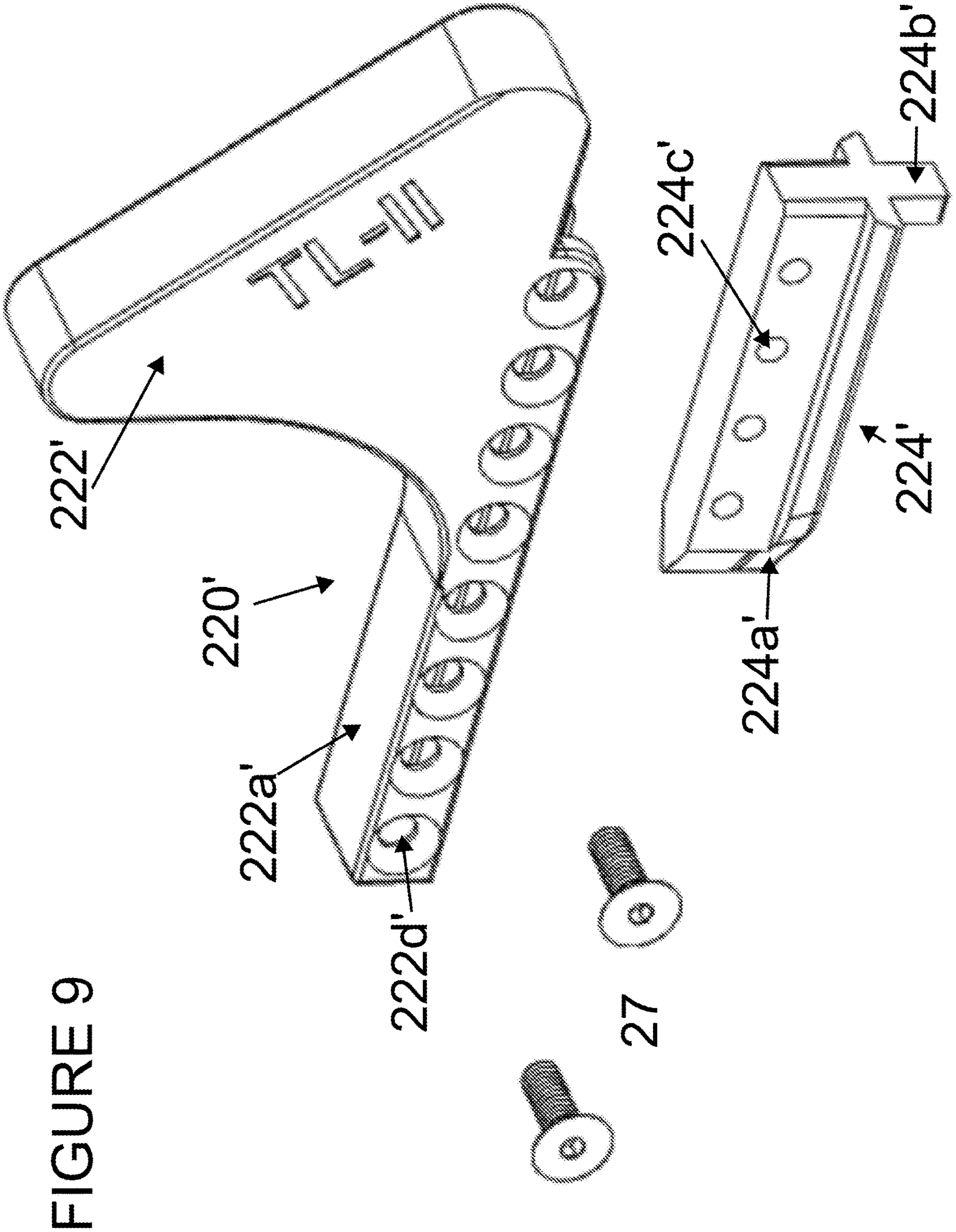
FIG. 9 illustrates an exploded assembly of a third embodiment of an unlocking mechanism of the present invention.

FIG. 9 illustrates an exploded assembly of a third embodiment of an unlocking mechanism of the present invention. In this third embodiment, the unlocking mechanism 220' is composed of a sliding contact shoulder 222' that fixedly attachable to a top portion of a latch release bar 224' via an adjustable connection bar 222a' that incorporates a plurality of set screw holes 222d'. The adjustable connection bar 222a' is fixedly connectable to a corresponding mounting bar 224c' of the latch release bar 224' via set screws 27 inserted into the plurality of set screw holes 222d' matched with a plurality of corresponding set screw receiving holes 224c' formed on the latch release bar 224'. As in the second embodiment, the latch release bar 224' is formed with a cam portion 224a' that engages with an upper portion of the unbolting lever 29 when the latch releaser bar 224' is moved leftward along the sliding channel 210a. When the deadbolt device 200 is installed, the sliding contact shoulder 222' is adjustably connected to the latch release bar 224'.

Figure 10:
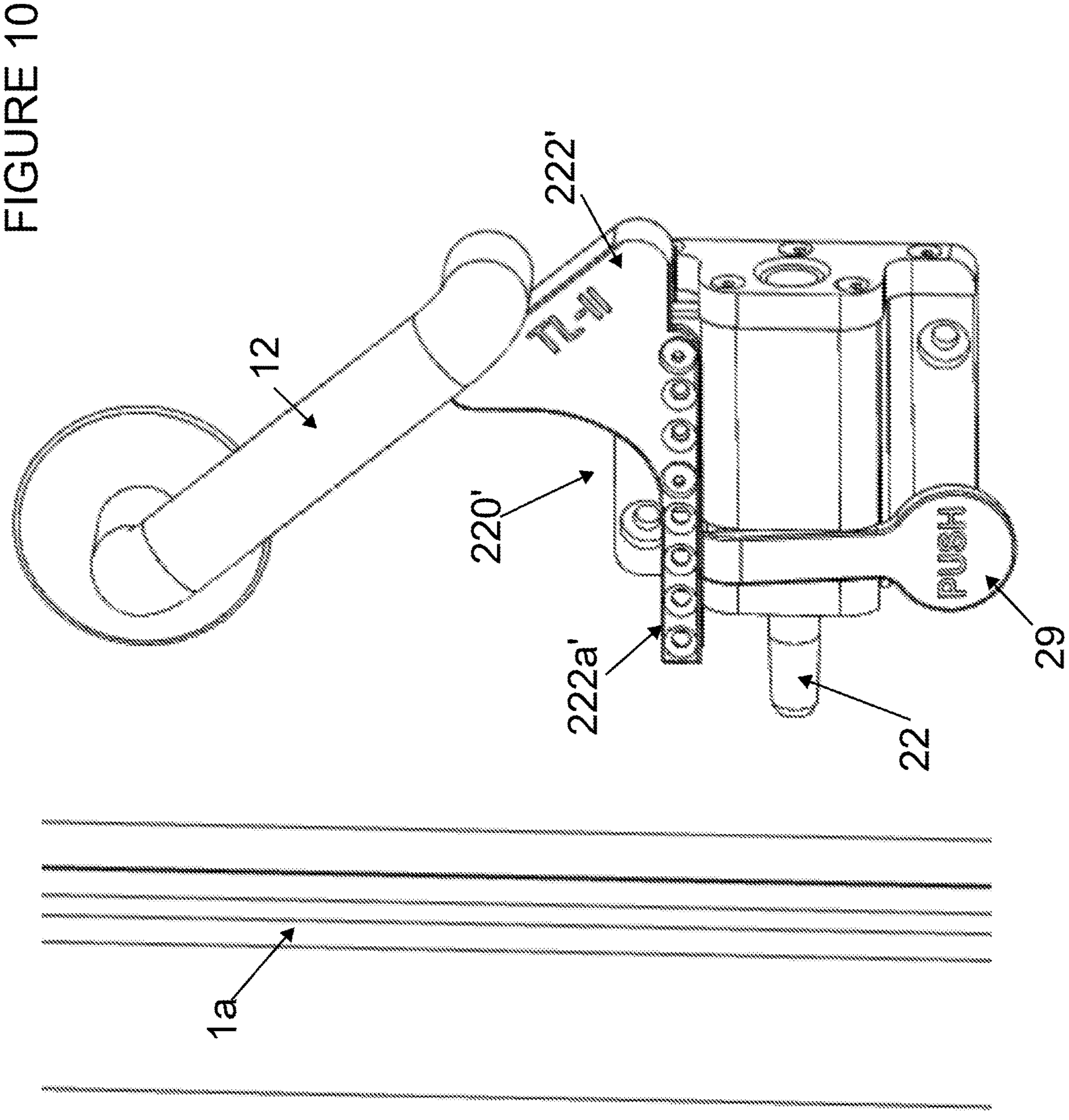
FIG. 10 illustrates an overall perspective view of a deadbolt assembly and an attached unlocking mechanism in the locked state with the door lever contacting the unlocking mechanism and the latch release in the unlocking state according to a third embodiment of the present invention.

As shown in FIG. 10, this adjustability in the unlocking mechanism 220' allows precise alignment of the deadbolt device 200 with the door lever 12. This also allows adjusting the degree to which the door lever 12 has to be rotated to contact with the sliding contact shoulder 222'. Otherwise, the structure and operation of the deadbolt device 200 and the unlocking mechanism 220' of this third embodiment are in accordance with those of the second embodiment as described in detail hereinabove.

In other variations of this embodiment of the unlocking mechanism 100, mirror images of all the components of the unlocking mechanism may be constructed such that the unlocking mechanism may operate with the sliding bar configured to move in a rightward direction relative to a deadbolt device to which it would be attached. Similarly, the deadbolt device may be constructed as a mirror image so as to operate and move in the direction to the deadbolt device employed with the present invention as described above. Such mirror image construction of the unlocking mechanism and deadbolt device allows the present invention to be ambidextrous, namely the present invention may be use on clockwise and counter-clockwise (i.e., left-handed or right-handed) door levers. With respect to the various screws used throughout the invention for mounting, setting or otherwise affixing various elements of the present invention, various sizes, dimensions and types of such screws may be used as would appropriate for their specific application as would be understood by those of skill in the art.

The foregoing discussion discloses and describes merely exemplary embodiments of the present invention. One skilled in the art will readily recognize from such discussion, that various changes, modifications and variations can be made therein without departing from the spirit and scope of the invention as defined in the present disclosure. Furthermore, while exemplary embodiments have been expressed herein, others practiced in the art may be aware of other designs or uses of the present invention. Thus, while the present invention has been described in connection with exemplary embodiments thereof, it will be understood that many modifications in both design and use will be apparent to those of ordinary skill in the art, and this application is intended to cover any adaptations or variations thereof. It is therefore manifestly intended that this invention be limited only by the present disclosure and the equivalents thereof.

We claim:

1. A deadbolt device for securing a room from an outside intruder, comprising:

an assembly housing having a bore, the assembly housing being fixedly mounted to a door;

a deadbolt slidably connected in the bore, the deadbolt including a first end and a second end;

a deadbolt spring operatively connected to the deadbolt to urgingly engage deadbolt away from a locked position of the deadbolt;

an unlocking lever movably mounted in the assembly housing to lockingly engage the deadbolt in the locked position;

a locking key formed as a tool removably separate from the assembly housing, the locking key being configured to be insertable into the bore of the assembly housing so as to engage with the second end of the deadbolt and push the deadbolt longitudinally in the bore to a locked position while the deadbolt is urged by the deadbolt spring away from the locked position, wherein the unlocking lever lockingly engages with the deadbolt, the first end of the deadbolt being fixedly engaged with a door frame of the door when the deadbolt is the locked position, and the unlocking lever is configured to release engaging with the deadbolt so as to release the deadbolt away from the locked position; and a sliding bar operatively connected to the unlocking lever and positioned to engage with a door handle on the door, the door handle being operatively connected to rotatively engage with the sliding bar when unlocking the door, wherein the sliding bar slidably engages with the unlocking lever as the sliding bar slidably engages with the door handle such that the unlocking lever releases engaging with the deadbolt so as to release the deadbolt away from the locked position simultaneously with the door handle rotatively unlocking the door.

2. A deadbolt device according to claim 1, wherein a sliding bar includes a cam head positioned to mechanically engage with the door handle on the door such that the door handle contactingly engages with the cam head in response to rotative motion of the door handle thereby engaging with the sliding bar to release the unlocking lever.

3. A deadbolt device comprising:

an assembly housing having a bore, the assembly housing being fixedly mounted to a door;

a deadbolt slidably connected in the bore, the deadbolt including a first end and a second end;

a deadbolt spring operatively connected to the deadbolt to urgingly engage deadbolt away from a locked position of the deadbolt;

an unlocking lever movably mounted in the assembly housing to lockingly engage the deadbolt in the locked position;

a locking key configured to be insertable into the bore of the assembly housing so as to engage with the second end of the deadbolt and push the deadbolt longitudinally in the bore to a locked position while the deadbolt is urged by the deadbolt spring away from the locked position, wherein the unlocking lever lockingly engages with the deadbolt, the first end of the deadbolt being fixedly engaged with a door frame of the door when the deadbolt is the locked position, and the unlocking lever is configured to release engaging with the deadbolt so as to release the deadbolt away from the locked position;

a sliding bar operatively connected to the unlocking lever and positioned to engage with a door handle on the door, the door handle being operatively connected to rotatively engage with the sliding bar when unlocking the door; and a latch release operatively connected between the sliding bar and the unlocking lever, wherein the sliding bar slidably engages with the latch release so as to convert sliding movement of the sliding bar to engage with the unlocking lever and thereby release engaging with the deadbolt so as to release the deadbolt away from the locked position, wherein the sliding bar slidably engages with the unlocking lever as the sliding bar slidably engages with the door handle such that the unlocking lever releases engaging with the deadbolt so as to release the deadbolt away from the locked position simultaneously with the door handle rotatively unlocking the door.

4. A deadbolt device according to claim 3, wherein a sliding bar includes a cam head positioned to mechanically engage with the door handle on the door such that the door handle contactingly engages with the cam head in response to rotative motion of the door handle thereby engaging with the sliding bar to release the unlocking lever.

* * * * *